United States Patent
Vanhouten et al.

(10) Patent No.: US 7,793,699 B2
(45) Date of Patent: Sep. 14, 2010

(54) APPARATUS FOR MOUNTING TIRES ON LARGE WHEELS

(76) Inventors: Reed Vanhouten, 400 Lois Ave., Tulare, CA (US) 93274; Jeremy Gunsolus, 1316 LaMesa Dr., Tulare, CA (US) 93274

( * ) Notice: Subject to any disclaimer, the term of this patent is extended or adjusted under 35 U.S.C. 154(b) by 0 days.

(21) Appl. No.: 12/154,299

(22) Filed: May 23, 2008

(65) Prior Publication Data

US 2009/0288781 A1  Nov. 26, 2009

(51) Int. Cl.
 *B60C 25/132* (2006.01)
(52) U.S. Cl. .............................. 157/1.33; 157/1.2; 157/2
(58) Field of Classification Search ................ 157/1.33, 157/1.3, 1.17, 1.1, 1.2, 1.28, 14, 17, 18, 2–5
See application file for complete search history.

(56) References Cited

U.S. PATENT DOCUMENTS

| | | | | | |
|---|---|---|---|---|---|
| 1,729,861 A | * | 10/1929 | Anderson | .................... | 157/1.2 |
| 1,948,434 A | * | 2/1934 | Stafford et al. | ............... | 157/1.2 |
| 3,500,891 A | * | 3/1970 | Collins | ........................ | 157/1.2 |
| 4,444,237 A | * | 4/1984 | Reed | ........................... | 157/1.2 |
| 4,580,612 A | * | 4/1986 | Smithkey | ..................... | 157/1.2 |
| 6,786,267 B1 | * | 9/2004 | Warren | ........................ | 157/1.2 |

* cited by examiner

*Primary Examiner*—Hadi Shakeri
(74) *Attorney, Agent, or Firm*—Dennis B. Haase

(57) ABSTRACT

A device for mounting a tire on a wheel that includes a locking ring to hold the tire in place on the wheel, where the device includes a locking member which locks to the rim of the wheel and includes a cross bar with depending feet, which is connected to the locking member and is movable toward the locking member with the depending push bars engaged with the locking ring to press the locking ring into locking engagement with the wheel.

3 Claims, 4 Drawing Sheets

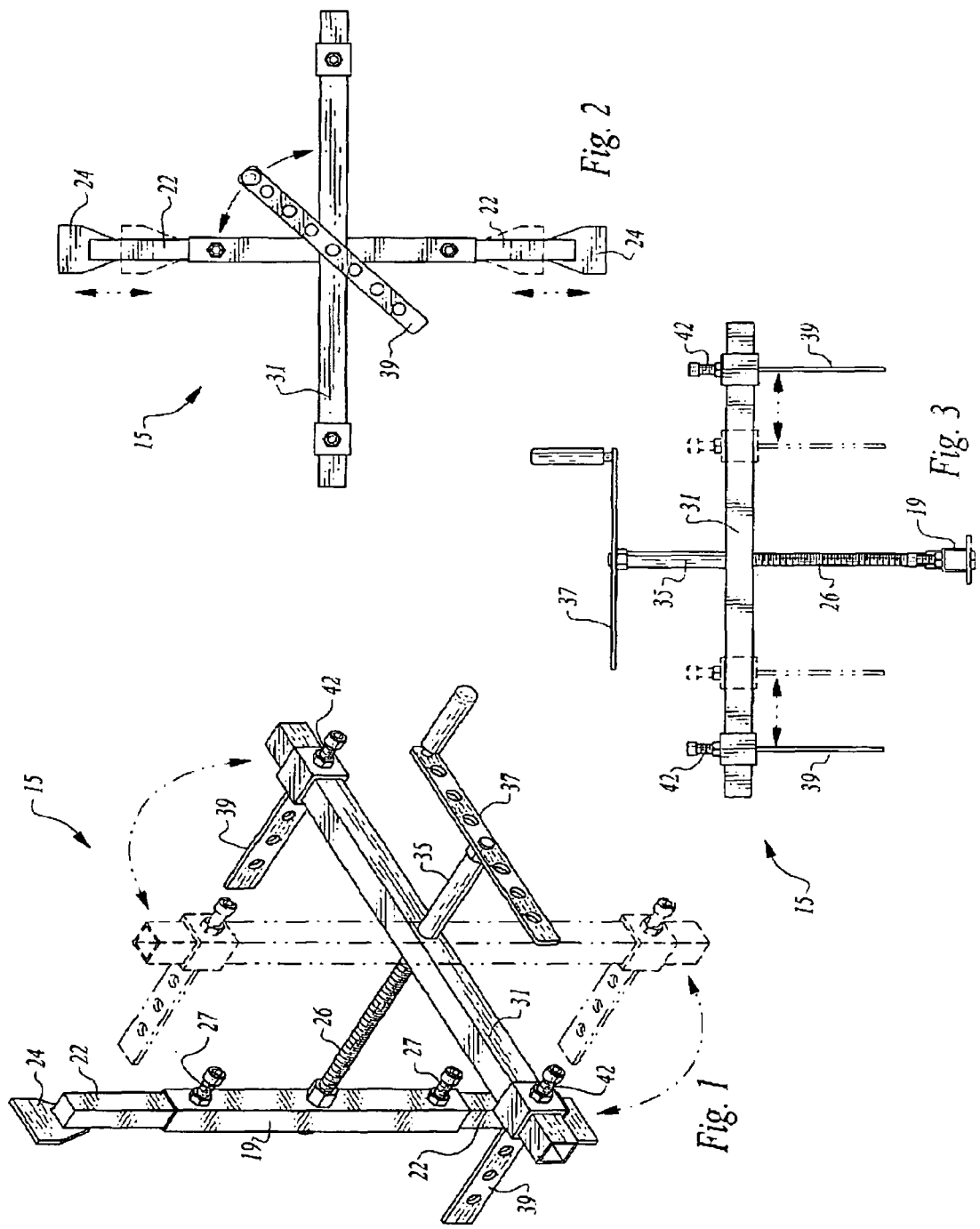

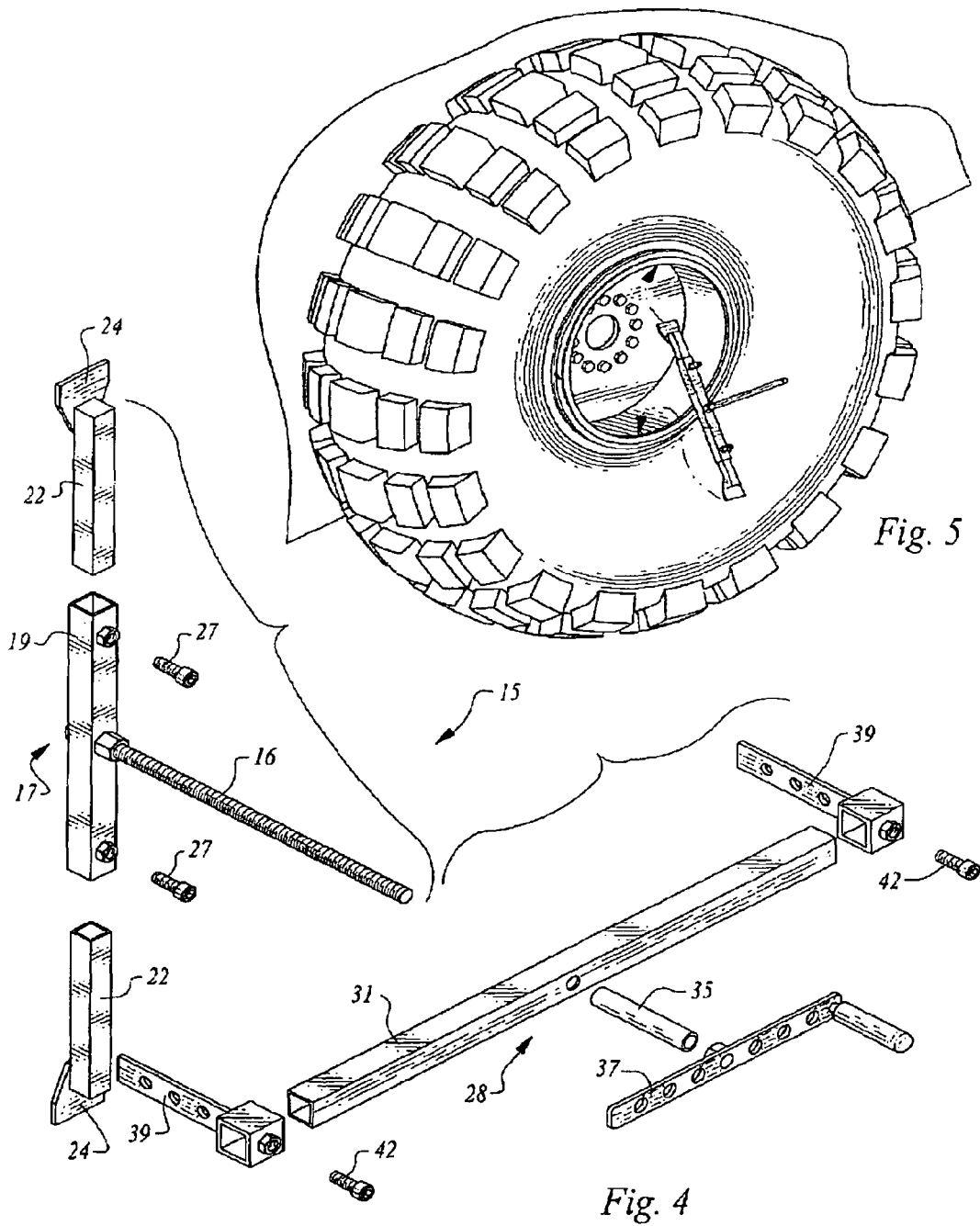

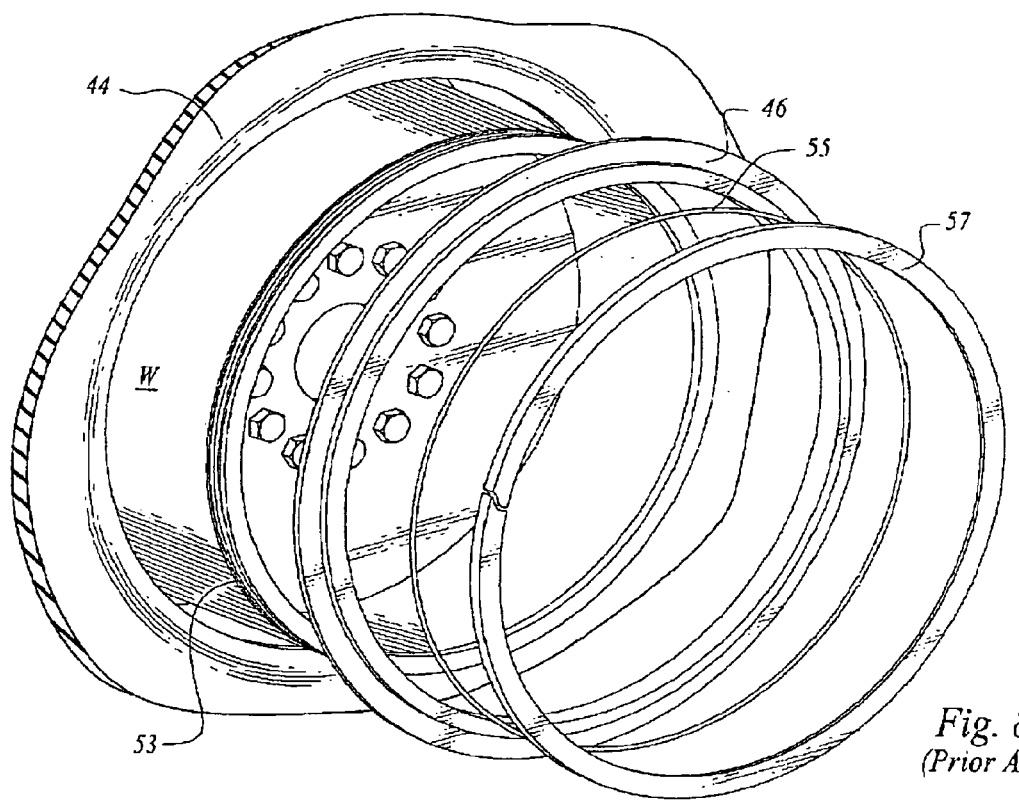
Fig. 8
(Prior Art)
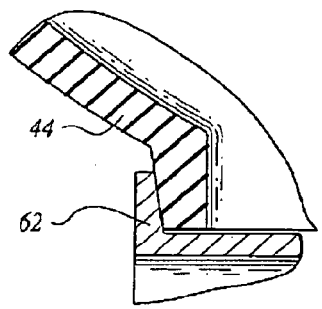
Fig. 10
(Prior Art)
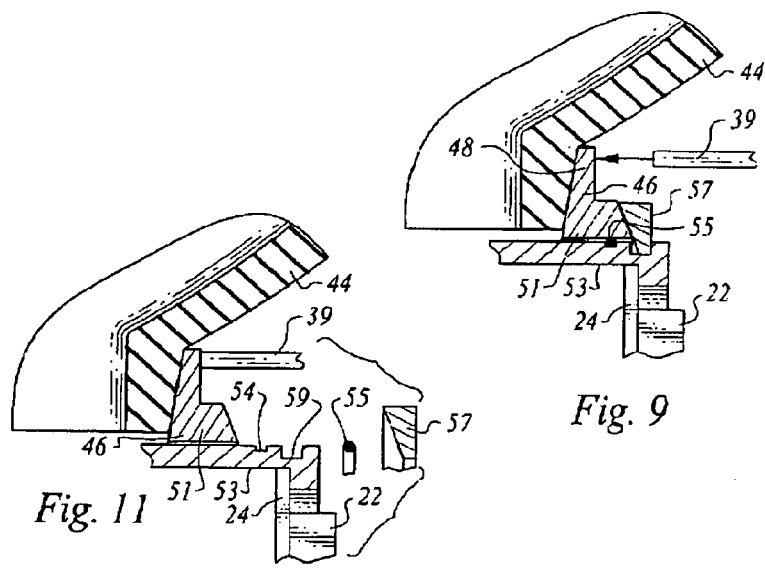
Fig. 9
Fig. 11

APPARATUS FOR MOUNTING TIRES ON LARGE WHEELS

The present invention relates generally to tire changing apparatus, and, more particularly, to apparatus for installing tires on wheels for large equipment having specialized wheel assemblies such as, e.g., tractors, front end loaders and off road construction equipment and, further, to accomplish such fetes in the field and without removing the wheel from the equipment.

BACKGROUND OF THE INVENTION

1. Field of the Invention

As heavy motorized equipment becomes more common in usage, as a means of increasing efficiency with a commensurate saving in time and money, repair and maintenance is of considerable concern. If the equipment is not working, it is losing money and down time is expensive.

In the day of the lug wheel, maintenance and repair on wheels was of little consequence. They did not wear significantly and seldom broke. With the advent of the inflatable rubber tire, however, another, and more consequential, aspect of repair and maintenance has been introduced. Whether it is an issue of flats, i.e., involuntary deflation, or tread wear, time is required to pull the wheel, remove the tire as needed, replace or repair the tire and reinstall the wheel on the equipment from which it was first taken.

Many of these work vehicles have a multi piece wheel in which retainer rings and locking rings are provided to position and hold the tire on the wheel. Front end loaders commonly employ such wheel assemblies and, as will appear hereinafter, the present invention is particularly adapted to assist in mounting tires on such equipment.

Unlike conventional motor vehicle wheels which may be as small as 13" and perhaps as large as 20" and are repaired at one's local garage, off road equipment, such as front end loaders, can not be efficiently and quickly moved to a nice comfortable garage with a flat concrete floor. Repair and replacement of tires on such equipment often must be handled in the dirt and mud of a field or quarry. How then does one change, and more particularly, replace a tire in the field quickly, efficiently and without removing the wheel from the piece of equipment involved? The present invention provides a novel answer.

2. Overview of the Prior Art

A search conducted among the patent art demonstrates that the focus of much of the innovation in the area involves devices used to break the bead of a tire from the rim of a wheel upon which the tire is mounted, as contrasted to the present invention in which the tire is mounted on the wheel and particularly a tire which is larger than the wheel was built to handle.

Examples of this art include Wicklund U.S. Pat. No. 5,191,934, which relates to what is referred to as a portable bead breaker. A cross bar has clamps which grab the rim of a wheel and a foot on the clamps is screwed down to break the bead of the tire from the rim. A variation on the same theme is found in Goebel U.S. Pat. No. 4,890,661, where rollers are provided to permit the bead breaker to be moved about the rim to break the bead about the circumference of the rim.

Claude Martin filed an application in 1940 which eventuated in two patents, U.S. Pat. Nos. 2,290,887 and 2,317,072, both of which relate to a tire tool featuring an elongated lever for providing a mechanical advantage in applying pressure necessary to break loose the tires of the time as part of the tire changing process, and Kohn U.S. Pat. No. 2,619,158 represents another bead breaking device, including an elongate lever.

Finally, Brunner U.S. Pat. No. 5,555,922 is yet another device for depressing the tire side wall as part of the bead breaking process for changing a tire.

None of the art located address the special problems attendant the installation of tires on the wheel assemblies described and in the field, without removing the wheel itself from the equipment which it supports.

SUMMARY OF THE INVENTION

Having addressed the problems attendant those who maintain and repair primarily off road equipment, it is the intent and purpose of the present invention to materially alleviate, if not eliminate, many of those problems.

More specifically, an objective of the present invention is to provide equipment and a method for the installation a tire on such vehicles without removing the wheel from the vehicle.

Another objective of the present invention is to provide a device for efficiently installing tires from larger diameter wheels. Yet another objective related to the foregoing, is to provide apparatus for the installation of a tire on a larger wheel, where the tire is a greater size than the wheel was built to accommodate.

Yet another, but no less important objective, is to accomplish the foregoing objectives with a single individual.

The foregoing, as well as other objectives and advantages of the present invention, will occur to those skilled in the art when the Detailed Description of a Preferred embodiment is read in connection with the accompanying drawings wherein:

BRIEF DESCRIPTION OF THE DRAWINGS

FIG. 1 is a pictorial view of the tire mounting apparatus of the present invention, illustrating portions of it in shadow to show how it operates;

FIG. 2 is a top plan view of the apparatus of FIG. 1;

FIG. 3 is a side elevation of the apparatus of FIG. 1;

FIG. 4 is an exploded view of the apparatus of FIG. 1;

FIG. 5 is a perspective view of an exemplary tire with the rim gripping device being positioned;

FIG. 8 is a view of the wheel, partially sectioned, and illustrating the various components of the wheel assembly;

FIG. 9 is small cut away of the wheel and with the tire in place, illustrating the interrelationship between them;

FIG. 10 is a view similar to FIG. 9, except illustrating the rear portion of the rim and tire; and FIG. 11 is a view of the same area as FIG. 9, but showing the retainer being pressed into place.

DETAILED DESCRIPTION OF A REFERRED EMBODIMENT

Figure 6:
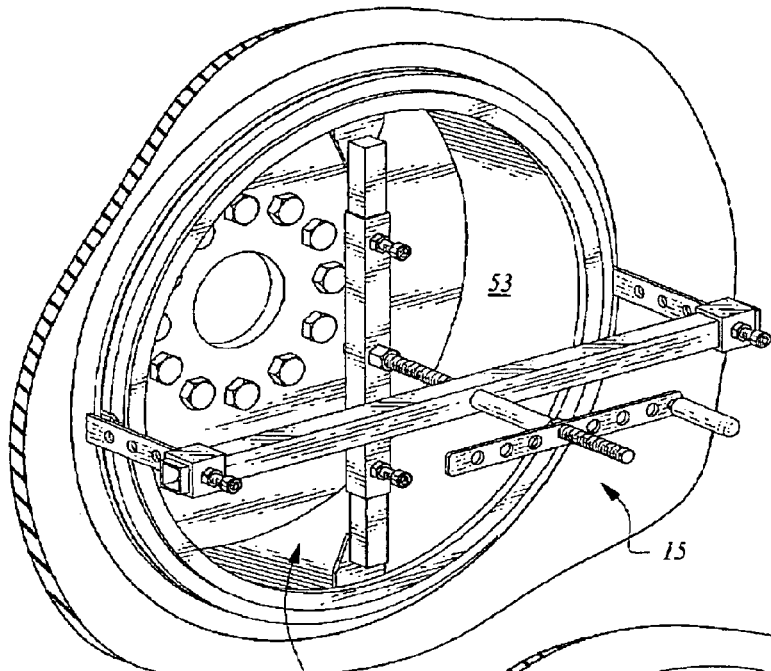
FIG. 6 is a partial sectional view of a tire with the rim gripping device in place and the remainder of the apparatus mounted in position relative thereto.
Figure 7:
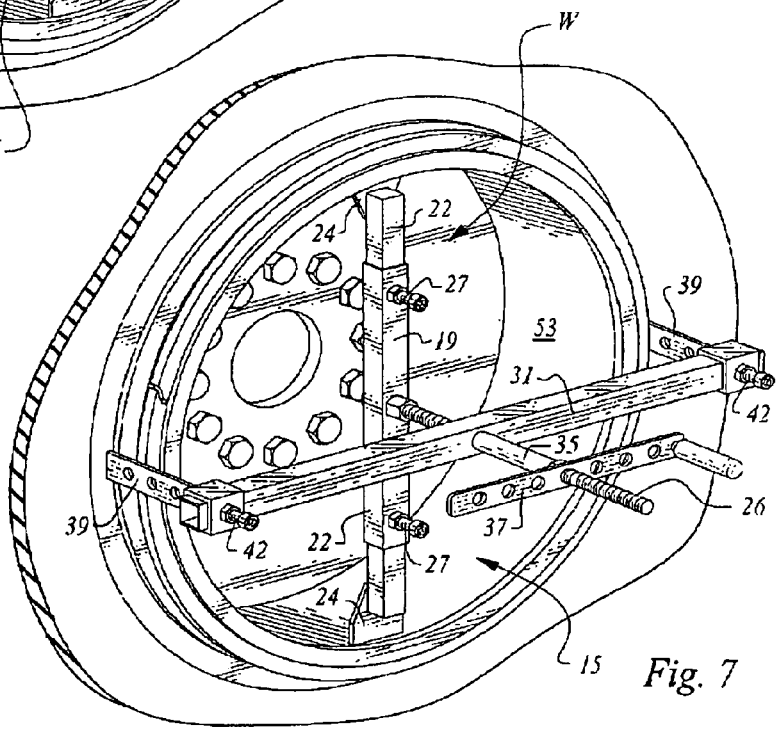
FIG. 7 is a view similar to that of FIG. 6, with the "O" ring about to be positioned on the hub of the wheel.

Referring now to the drawings, and initially to FIG. 4, the elements which make up the apparatus for mounting a tire on a specialized wheel are individually displayed. The elements which comprise the mounting device or apparatus 15 comprise a rim grabber 17 which includes a lateral locking member 19, which is tubular in construction, and includes extensions 22 at either end of the lateral locking member, each of which has a rim engaging end plate 24 at the end thereof. Fasteners 27 are fitted inboard of the remote ends of the lateral position fixing member 19 and pass through the wall of the lateral member 19 to selectively engage the extensions 22 and secure them in a preselected position firmly against the inner wall of the rim of the wheel to thereby stabilize the mounting device in a fixed position relative to the wheel.

A threaded rod 26 is secured in, and extends outwardly from, the center of the lateral position fixing member 19 at right angles thereto. A cross bar assembly 28 serves to span the wheel and is parallel to the lateral position fixing member. The cross bar assembly includes a tubular member 31, which is provided with an aperture 33, adapted to receive the threaded rod 26 there through. When assembled, a spacer 35 fits over that portion of the threaded rod 26 which extends beyond the cross bar member 31. The spacer minimizes the number of turns needed to engage the cross bar assembly.

A crank 37 is threaded on to the threaded rod 26 where it is rotatable to move the cross bar 28 toward a wheel which is in the process of receiving a tire. Assisting in this process is a pair of opposed parallel push bars 39. Each push bar 39 circumscribes, and is slidably mounted on the cross member where they depend from the cross member 31 and are moveable along the cross member to a predetermined position in alignment with the locking ring of the wheel, where it is secured by any one of several well known fasteners such as allen screws 42. The push bars are manually positioned in alignment with the locking ring along the cross bar 31 to permit the operator to exert optimum pressure on the locking ring, as will become apparent hereinafter. Once positioned they are secured to the cross bar 31 by the fasteners 42.

Turning now to FIGS. 1-3, the mounting device 15 is illustrated in full assembly and the utility of the various elements can be appreciated. First, however, consider the type of wheel to which the present invention applies. Referring to FIG. 8, such a wheel is illustrated in disassembly. A wheel 44 supports a tire, the side wall of which is shown at 44. The tire slides onto the wheel and is secured in place first by a retainer ring 46 [refer to FIG. 9] which has an upstanding plate 48, which presses against the tire side wall 44, and a base member 51 is at right angles to the upstanding plate and sits on the rim 53 of the wheel which projects out from the wheel W. The side wall and base member are preferably integrally formed.

The wheel rim 53 is provided with a groove 54 which receives an "O" ring 55. The system for retaining the tire on the wheel is completed by a locking ring 57 which, when pushed into a locking groove 59, holds the entire assembly in place. FIG. 11 shows the entire assembly in its proper place to mount and fix the tire on the wheel.

In order, however, to achieve a fixed position of the locking ring 57, pressure must be applied on the locking ring, the retainer ring 46 and the "O" ring having first been situated on the rim 53 of the wheel W. That, as will become clear, is the function of the apparatus 15 of the present invention.

Referring to FIGS. 5 and 6, it will be seen that the lateral member 19 has been placed within the circumference of the wheel W and the extensions 22 in gripping relation against the rim 53 of the wheel. The tubular cross member is mounted on the threaded rod 26 and the push bars 39 are aligned with the retainer ring 46 on opposite sides thereof in order that the pressure ultimately applied to the locking ring is evenly distributed.

As the crank is then rotated, it descends on the drill rod and presses against spacer 35, which in turn urges the tubular cross member 31 downwardly toward the wheel where the feet 39 engage the locking ring, urging it along the flange and ultimately into the locking groove 59. This motion places pressure on the tire bead and simultaneously presses the rear tire sidewall against an upstanding flange 62, resulting in the tire being secured on the wheel by one operator.

Clearly, once the locking ring drops into the locking groove, the tire is secured on the wheel, and it was accomplished with a single operator using the apparatus 15.

It will be understood that those skilled in the art may conceive of some variations in the elements which comprise the apparatus of the present invention, such as, e.g. using a powered device in place of a manual crank, without changing the fundamental operation thereof. Such variations are within the contemplation of the invention as set forth in the accompanying claims, wherein:

The invention claimed is:

1. In combination, a tire-wheel assembly and a mounting apparatus comprising:
    said tire-wheel assembly having a tire, a wheel, a rim which includes a retainer, an "O" ring and a locking ring;
    said mounting apparatus, for mounting the tire on the wheel without removing the wheel from its vehicle, including a rim grabber, a cross bar assembly and a crank;
    said rim grabber including a lateral locking member;
    said lateral locking member being fitted with extensions, said extensions having end plates engageable with the side wall of the rim to secure said rim grabber thereto to fix said mounting apparatus relative to the wheel;
    said cross bar assembly having a tubular member being parallel to said rim grabber, and movably connected thereto;
    said cross bar assembly being movable toward and away from said rim grabber via a threaded rod connecting said tubular member with said lateral locking member and actuated by said crank, whereas movement of said cross bar assembly toward said rim grabber by said crank results in pressure on said retainer ring to move said retainer ring so as to permit said locking ring to be positioned in and removed from said rim, and to remove and replace the tire on the rim without removing the well.

2. The combination of claim 1, wherein said cross bar assembly is fitted with push bars, said push bars being aligned and engageable with said retainer ring to move said retainer ring to said rim to thereby permit said locking ring to be positioned and removed from said rim, thus permitting removed removal of the tire mounted thereon.

3. The combination of claim 2, wherein said push bars are moveable along said lateral cross bar and lockable in position on said cross bar in alignment with said retainer ring.

* * * * *

UNITED STATES PATENT AND TRADEMARK OFFICE
CERTIFICATE OF CORRECTION

| | | |
|---|---|---|
| PATENT NO. | : 7,793,699 B2 | Page 1 of 1 |
| APPLICATION NO. | : 12/154299 | |
| DATED | : September 14, 2010 | |
| INVENTOR(S) | : Reed Van Houten and Jeremy Gunsolus | |

It is certified that error appears in the above-identified patent and that said Letters Patent is hereby corrected as shown below:

Title Page; item (76);
Please correct the first inventor's name to read:   Reed Van Houten Signed and Sealed this
Fourth Day of January, 2011

David J. Kappos
*Director of the United States Patent and Trademark Office*